Figure 1:
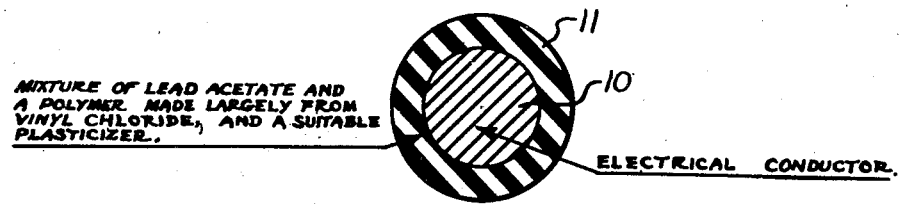

Dec. 31, 1946.  W. C. SEARS  2,413,673
INSULATED ELECTRICAL CONDUCTOR
Filed Jan. 21, 1941

Inventor
William C. Sears
By Willis F. Avery
Atty.

Patented Dec. 31, 1946

2,413,673

UNITED STATES PATENT OFFICE 2,413,673

INSULATED ELECTRICAL CONDUCTOR

William C. Sears, Akron, Ohio, assignor to The B. F. Goodrich Company, New York, N. Y., a corporation of New York Application January 21, 1941, Serial No. 375,248

4 Claims. (Cl. 174—120)

This invention relates to an improved insulating composition for use with electrical conductors and pertains specifically to plasticized polyvinyl halide compositions.

It is well known that plasticized compositions of polymers made largely from vinyl chloride, such as gamma-polyvinyl chloride, copolymers of vinyl chloride with minor proportions of vinyl esters such as vinyl acetate or vinyl cyanide, or of vinylidene chloride, may be used as electrical insulating material.

In most respects the polyvinyl halide insulation is superior to all previously known insulating materials. It is very pliable and does not chip or crack when bent, even at low temperatures. It is resistant to oil and gasoline, to the ozone formed by electrical discharges, and to most corrosive chemicals. It has good abrasion resistance and is durable enough so that it may be used alone as wire insulation, without any protective covering such as the cotton jackets used with rubber insulation.

However, the polyvinyl halide compositions used hitherto have one important failing—the electrical resistivity of the material tends to decrease with age, especially when the aging occurs at an elevated temperature. In many cases the elevated temperature is a necessary result of the practical use of the material, inasmuch as the current passing through the conductor produces sufficient heat to raise the temperature of the combination conductor and insulation to 50° C. or 75° C. or even higher. This increase in temperature promotes the rapid deterioration of the resistivity of the insulation.

Other properties of the polyvinyl halide composition, notably the color, may change upon aging, and various stabilizing compounds have been proposed which will maintain these properties unchanged. There is no relationship, however, between the stabilizing effects of these compounds on one property of the material and their effect on another property. For example, a material which is an excellent color stabilizer for a polyvinyl halide composition when aged at 100° C. in the absence of light may be a poor color stabilizer for a composition aged under ultraviolet light at room temperature and vice versa. Similarly, the stabilizing action of various salts on the electrical properties of polyvinyl halide compositions is totally unrelated to the aforementioned heat or light stabilizing effects.

I have discovered that lead acetate, which is only a moderately effective heat or light stabilizer, is by far the best electrical stabilizer yet discovered for polyvinyl halide compositions. Many other compounds have been proposed for improving the electrical resistivity of these resin compositions, but my invention provides an insulation the resistivity of which is maintained more than 400% longer than the resistivity of an insulation containing an equal amount of lead oxide, the best previously known stabilizer. The preferred amount of lead acetate to be used in my insulation is about 3% to 6% of the composition. However, there is nothing critical about this range. Smaller amounts give less stability, larger amounts give greater stability but tend to change the other physical properties of the insulation, such as hardness and low temperature flexibility, more than is desirable.

As a specific example of my invention, I have prepared a composition consisting of 100 parts by weight of gamma polyvinyl chloride, 62.5 parts of tricresyl phosphate, and 5 parts of lead oxide. This composition was sheeted out on a mill, molded at 297° F. and aged at 100° C. The specific resistivity, measured in ohms$\times 10^9$ per cubic centimeter at 70° C., was 21 after 2.85 days aging, and 2.9 after 12.5 days. A similar composition, in which the lead oxide was replaced by lead acetate, had a resistivity of 18.0 ohms$\times 10^9$ after 2.85 days, but did not drop below 3.8 for 71.3 days. When 10 parts of lead acetate were used instead of 5 parts, the resistivity was only 12.2 after 2.85 days, but increased gradually to 128 after 62.0 days and then fell off slowly to 2.4 after 117.5 days.

These results clearly show the tremendous advantages to be secured by employing my discovery. Under less severe aging conditions, of course, insulation containing my stabilizer would stand up for a much longer time. At room temperature my new insulation maintains resistivity practically indefinitely.

Any of the plasticizers commonly used with gamma polyvinyl chloride may be used in my new insulation, such as dibutyl phthalate, dioctyl phthalate, o-ditolyl ether, butyl phthalyl, butyl glycollate, etc., in an amount sufficient to give a product with the desired degree of resiliency, tensile strength, and other physical properties. Many other pigments, fillers, dyes, light and heat stabilizers may also be used in my insulation without destroying the stabilizing effect of the lead acetate. Plastic materials which are compatible with polyvinyl chloride may also be mixed in the composition.

Any of the usual methods of application of thermoplastic insulating compositions to conductors, such as extrusion of the plastic on the conductor, dipping in a solution of the plastic, wrapping with a tape made from the plastic, etc., may be used. An inner coating of such insulation as asphalt, pitch, rubber, or other material may be used in combination with an outer insulation of my new composition.

Figure 2:
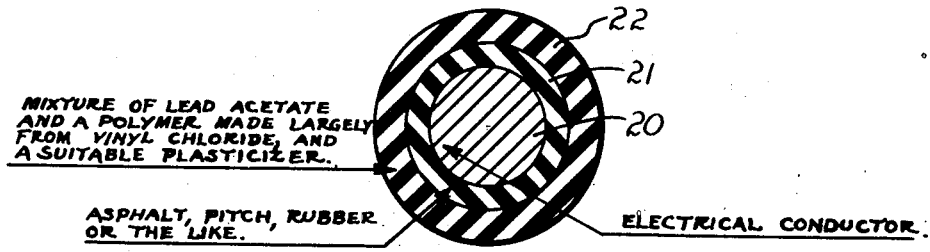

In the appended drawing, Fig. 1 is a cross-section of one modification of my invention; and Fig. 2 is a cross-section of a second modification of my invention. In Fig. 1 an electrical conductor 10 is provided with an insulating layer 11 comprising a plasticized polymer made largely from vinyl chloride, and lead acetate. In Fig. 2 an electrical conductor 20 is provided with an inner insulating layer 21 of asphalt, pitch, rubber, or other material, and an outer insulating layer 22 comprising a plasticized polymer made largely from vinyl chloride, and lead acetate.

Although I have herein disclosed specific embodiments of my invention, I do not intend to limit myself solely thereto, but only to the spirit and scope of the appended claims.

I claim:

1. An electrical conductor in combination with an insulating layer comprising a plasticized polymer made largely from vinyl chloride, and lead acetate.

2. An electrical conductor in combination with an insulating layer comprising plasticized gamma polyvinyl chloride and lead acetate.

3. An electrical conductor in combination with a double insulating layer, the outer layer comprising a plasticized polymer made largely from vinyl chloride, and lead acetate.

4. An electrical conductor in combination with a double insulating layer, the outer layer comprising plasticized gamma polyvinyl chloride and lead acetate.

WILLIAM C. SEARS.